United States Patent
Sugimoto et al.

(10) Patent No.: US 6,531,242 B1
(45) Date of Patent: Mar. 11, 2003

(54) ENCLOSED CELL AND SEALER

(75) Inventors: Yoshiyuki Sugimoto, Yamaguchi-ken (JP); Kinji Saijo, Yamaguchi-ken (JP); Hiroaki Kawamura, Yamaguchi-ken (JP); Hiroaki Okamoto, Yamaguchi-ken (JP); Yoshihiko Isobe, Yamaguchi-ken (JP)

(73) Assignee: Toyo Kohan, Ltd., Tokyo (JP)

( * ) Notice: Subject to any disclaimer, the term of this patent is extended or adjusted under 35 U.S.C. 154(b) by 0 days.

(21) Appl. No.: 09/600,408
(22) PCT Filed: Jan. 14, 1999
(86) PCT No.: PCT/JP99/00095

§ 371 (c)(1),
(2), (4) Date: Sep. 28, 2000

(87) PCT Pub. No.: WO99/36975
PCT Pub. Date: Jul. 22, 1999

(30) Foreign Application Priority Data

Jan. 16, 2000 (JP) ............................................. 10/18292

(51) Int. Cl.⁷ ................................................. H01M 2/12
(52) U.S. Cl. ............................................ 429/82; 429/56
(58) Field of Search .................... 429/53, 54, 56, 429/82

(56) References Cited

U.S. PATENT DOCUMENTS 4,581,304 A * 4/1986 Beatty et al. ............... 429/56
5,248,568 A * 9/1993 Getz .......................... 429/174
5,738,952 A * 4/1998 Abe ........................... 429/174

FOREIGN PATENT DOCUMENTS

| JP | 5-314959 | 11/1993 |
| JP | 7-105933 | 4/1995 |
| JP | 7-253302 | 10/1995 |
| JP | 8-180848 | 7/1996 |

* cited by examiner

Primary Examiner—Patrick Ryan
Assistant Examiner—Gregg Cantelmo
(74) Attorney, Agent, or Firm—Browdy and Neimark, P.L.L.C.

(57) ABSTRACT

A completely-enclosed cell wherein if the internal pressure in the cell rises because of short circuit or overcharging, temperature rise and explosion of the cell is effectively prevented, the current is cut off, and the internal pressure is simultaneously and quickly released. The cell includes a sealer comprising a valve body composed of a metal substrate perforated at narrowly spaced intervals in the endless periphery and a metal foil 72 substrate to cover the perforations. The cell a structure in which a narrow gap portion of a 98 metal plate deformable even by a weak force of when the internal pressure increases elongates and the portion surrounded by the through holes projects 122.

7 Claims, 5 Drawing Sheets

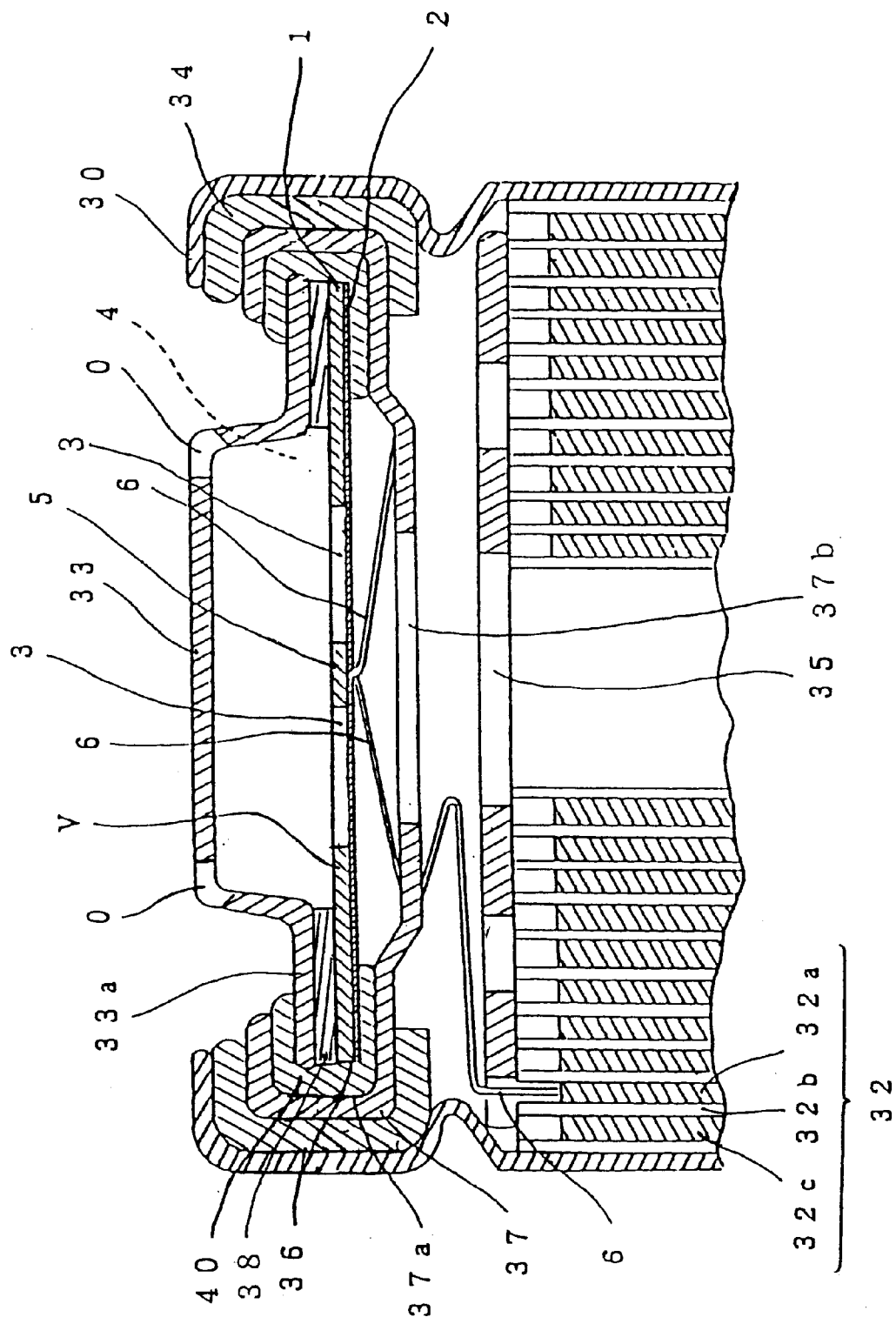
[Fig.1]

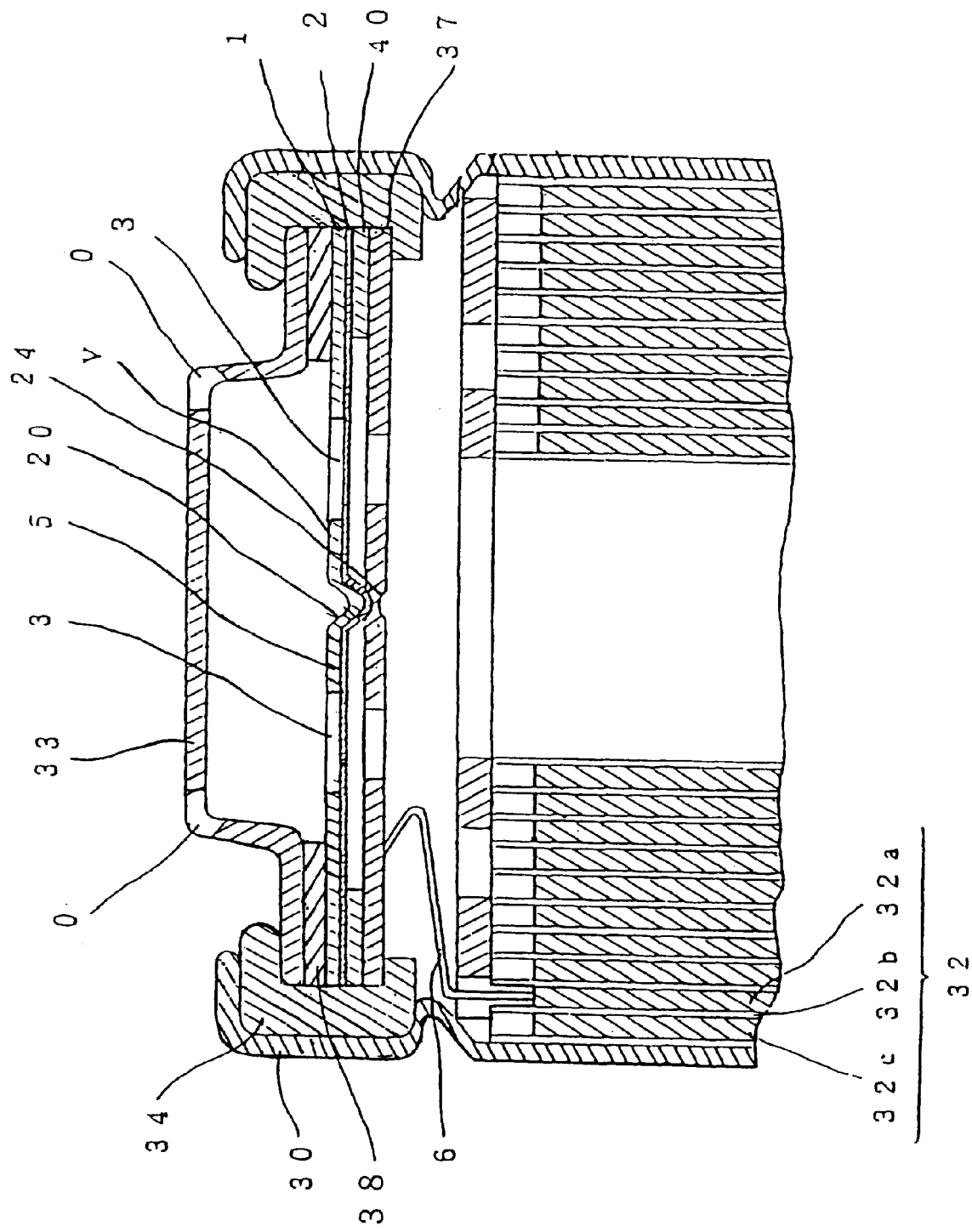
[fig. 2]

[Fig. 3]
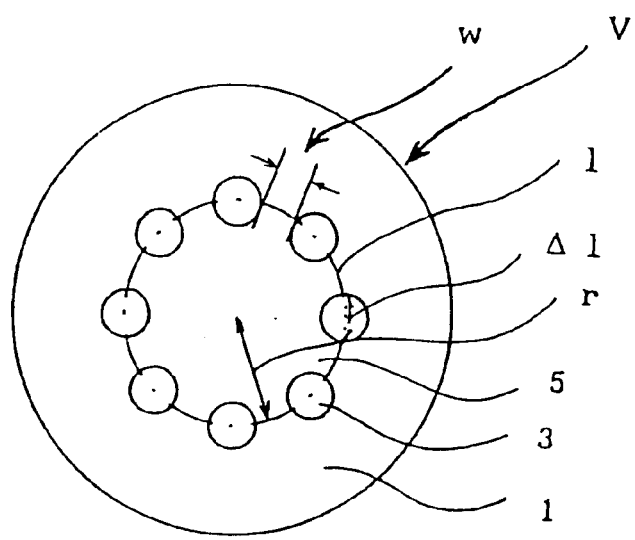
[Fig. 4]
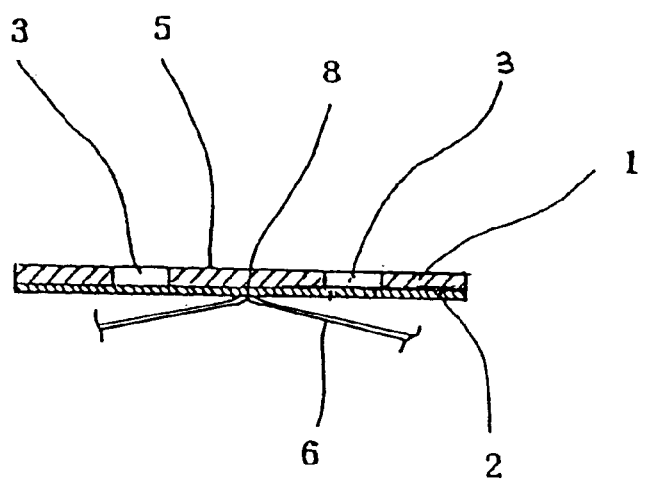

[ Fig.5 ]
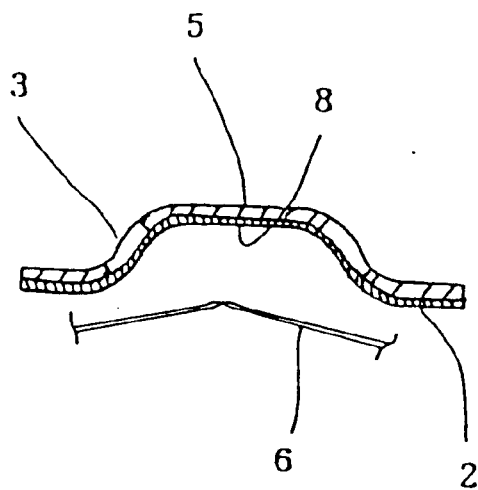
[ Fig.6 ]
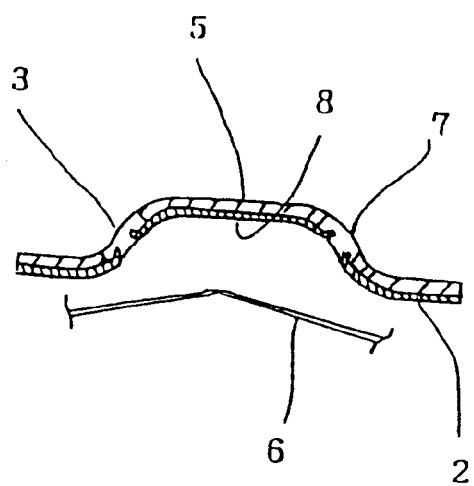

[Fig. 7]
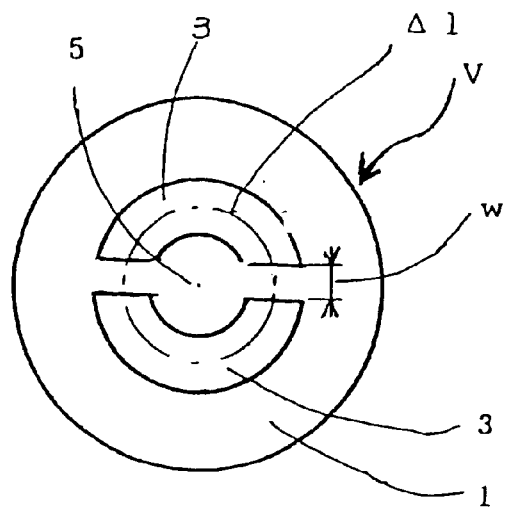
[Fig. 8]
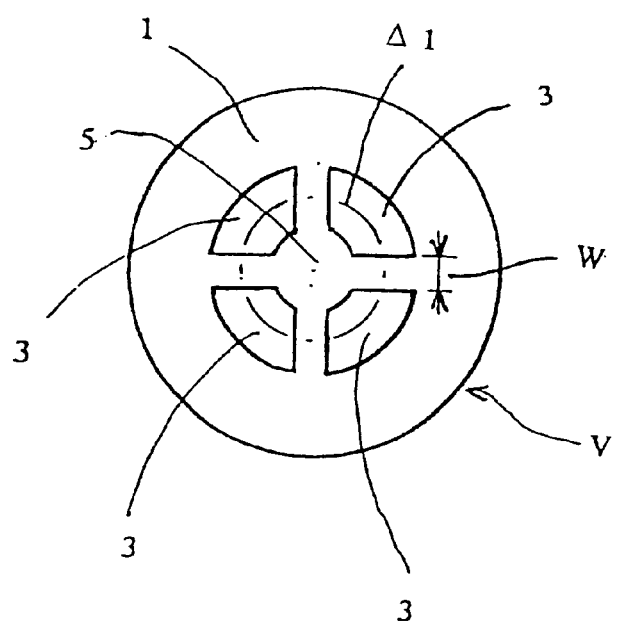

ENCLOSED CELL AND SEALER

CROSS REFERENCE TO RELATED APPLICATION

The present application is the national stage under 35 U.S.C. 371 of PCT/JP99/00095, filed Jan. 14, 1999.

BACKGROUND OF THE INVENTION

1. Field of the Invention

The present invention relates to a closed battery capable of rupturing at a fixed pressure, especially at a low pressure, to readily release the internal pressure and at the same time to cut off the current, when the temperature or the internal pressure of the battery is elevated.

2. Description of Related Art

Recently, with increasing demand for electronic devices that are made much smaller in size and have enhanced performance, non-aqueous electrolyte batteries with light weight and high energy density such as lithium ion secondary battery have been popularly used. Since the non-aqueous electrolyte battery uses an alkali metal such as lithium, sodium, or potassium as an active material of negative electrode thereof and such alkali metal easily reacts with water to generate gases, it employs a container of completely sealed structure. Such a completely closed battery is excellent in storability, but reversely, there arises a problem due to the very high sealability. Namely, if the battery is exposed to high temperature or is short-circuited inside or outside thereof and a large current flows, or if hydrogen gas is generated in the battery due to the moisture included in the manufacturing process, the internal pressure of the battery is sometimes abnormally elevated and the battery bursts, which may damage the devices. There may be also a danger of injuring the user of the device. Accordingly, it is necessary to provide some mechanism for releasing internal pressure of the battery before it is increased to a high extent.

So far, several methods for releasing the internal pressure of a battery have been proposed and some of them have been used in practice. For instance, Japanese Patent Laid-open Publication No. HEI-2-304861 discloses a mechanism of a safety valve for a battery. This safety valve is constructed such that a battery container is provided on a portion thereof with a valve chamber having a valve opening leading to the inside of the battery and an exhaust hole leading to the outside. The valve chamber is provided with a valve member, in which at least the surface facing the valve opening is made of rubber, and an elastic member to press rubber-made surface of said valve member against the valve opening. Thus, the rubber of the valve member closes the valve opening so that the sealability of the battery can be ensured, while the valve opening is unsealed when the internal pressure reaches a fixed pressure for the elastic member to permit pressure releasing so that excessive elevation of the internal pressure can be prevented.

Such a conventional safety valve has been widely used in Ni—Cd type batteries. However, it has not yet been used in the non-aqueous batteries which employ alkali metals as the active material of the negative electrode, since even if the elastic member presses the valve member against the valve opening to thereby close the battery, it is impossible to obtain such a high sealability as required for the non-aqueous batteries.

One of the methods for releasing the internal pressure of a battery which requires high sealability is disclosed in Japanese Patent Laid-open Publication No. SHO-63-285859. In this method, a container of the battery is provided at a portion of its wall with a thinned portion. This thinned portion is formed by cold compressing the can wall sheet using a pressing machine until the thickness of the compressed portion of the sheet becomes half of the original thickness thereof. Thus, this thinned portion can provide the battery with good sealability since a portion of a can body having no opening on it is only transformed.

Another pressure releasing mechanism of this type is disclosed in Japanese Patent Laid-open Publication No. HEI 6-215760. This releasing mechanism is provided with a valve diaphragm fitted in an open end portion of at the upper portion of an electrode element in a cylindrical outer container having a bottom and a lead for cutting-off the current disposed above the valve diaphragm. In this structure, when the internal pressure of the battery is elevated, the valve diaphragm is expanded to rupture the lead for cutting-off the current to break off the current.

According to the method as disclosed in Japanese Patent Laid-open Publication No. SHO-63-285859, it is necessary to thin off a thinned wall portion of the container so that the thinned portion can be ruptured at a relatively low pressure. However, when the wall portion is too thinned off, there may be formed fine or minute cracks during press-forming, which may impair the sealability of the battery container. Further, when metals are processed by cold working, they are inevitably hardened by working. However, the working does not always cause uniform hardening, and therefore, there arises a problem that the operating pressure for such pressure releasing mechanism may vary. There is a half-etching method for making the thinner portion of the wall of a battery container. However, it is extremely difficult to control the remaining thickness of the thinned portion remained after etching, and it is also difficult to obtain a good yield. Another problem is that pinholes are generated in the half-etched portion, and therefore, all the products need to be inspected.

According to the method as disclosed in Japanese Patent Laid-open Publication No. HEI-6-215760, it is necessary to accurately control the depth of a cut off portion formed in the lead. This method is difficult in view of its forming, which cause a problem that the current is not reliably cut off at a fixed pressure.

With a view to solving drawbacks of the conventional methods as mentioned above, it is an object of the present invention to provide a closed battery incorporating a valve chip which can be stably and accurately ruptured at a fixed pressure, especially at a low pressure, so as to release the internal pressure thereof and which can be manufactured easily, and a closing member for use in the above mentioned closed battery. It is also the object of the present invention to provide a closing member having a configuration capable of being easily handled and almost free from causing defective products in the manufacturing process, and a closed battery using the closing member.

SUMMARY OF THE INVENTION

The above mentioned problem can be solved according to the present invention by a closed battery comprising an outer container, an electrode element consisting of a positive electrode, a negative electrode, and a separator, accommodated in said outer container together with an electrolyte, and a closing member secured to the inner periphery of an open end portion of the outer container so as to close the open end portion. The closing member consists of a valve element and a metal foil, and the valve element is formed of a metal substrate, on which a plurality of perforated openings are disposed along an endless circumference with small interval between each opening. The metal foil is laminated to the inner surface of the metal substrate so as to close the perforated openings. When the internal pressure of the battery is elevated, portions of the small interval between the openings formed on the metal substrate, which are transformable by a small force, are elongated so as to cause a portion of the metal substrate encircled by the plurality of perforated openings disposed on the endless circumference to be projected.

According to the configuration of the present invention, a valve chip, which is composed of the portion of the metal substrate encircled by the plurality of perforated openings and the metal foil, is connected with a lead cover for conducting a current from the electrode element. When the internal pressure of a battery is elevated, the portion encircled by the plurality of perforated openings is projected, and the lead cover is electrically disconnected from the metal foil to cut off the current. When the internal pressure is further elevated, the metal foil, which is laminated to close the openings of the valve element formed of the metal substrate having the perforated openings thereon, ruptures to release the internal gas of the battery so as to prevent burst of the battery container.

The above mentioned plurality of perforated openings are circular openings having the same diameter. They are preferably be disposed with equal intervals respectively along a circumference of a fixed radius around the center of the valve element, which is an example for the endless circumference. Further, the sum total length of the openings formed as the plurality of perforated openings on the endless circumference is preferably 30 to 85% of the whole length of the endless circumference.

Furthermore, the metal substrate is preferably a steel sheet, a stainless steel sheet, a copper sheet, or an aluminum sheet. The metal foil is preferably a steel foil, a stainless steel foil, a copper foil, an aluminum foil, a nickel foil, or a nickel-iron alloy foil.

Thus, the closing member of the present invention is constructed such that a portion thereof is transformed at a fixed pressure to rapidly cut off the current of the battery when the internal pressure is elevated. The closing member is further provided with a mechanism for ruputuring itself at a fixed pressure to release the internal pressure. The above mentioned fixed pressure for cutting off the current can be set arbitrarily according to the shape and disposition of the openings, and the pressure value at the internal pressure released can be set arbitrarily according to the material and thickness of the metal foil.

BRIEF DESCRIPTION OF THE DRAWINGS

FIG. 1 is a vertical section view showing an upper part of a completely closed battery by way of an example of the present invention.

FIG. 2 is a vertical section view showing an upper part of a completely closed battery by way of another example of the present invention.

FIG. 3 is a plan view showing a closing member having a valve element.

FIG. 4 is a vertical section view showing the closing member.

FIG. 5 is an explanatory view showing an action of the closing member when the internal pressure of the battery is abnormally elevated.

FIG. 6 is an explanatory view showing an action of the closing member when the internal pressure of the battery is abnormally elevated.

FIG. 7 is a plan view showing another example of the closing member.

FIG. 8 is a plan view showing still another example of the closing member.

EXPLANATION OF REFERENCE CHARACTERS

0: through hole
1: metal substrate
2: metal foil
3: perforated opening
5: portion of valve element
6: lead wire
7: valve opening
8: brazed portion
20: concave portion
24: projection
30: outer container
32: electrode element
32a: positive electrode
32b: separator
32c: negative electrode
33: closing cap
33a: periphery cover
34: insulating gasket
36: periphery
37: lead cover
37a: circumference
37b: through hole
38: positive temperature coefficient element
40: insulating gasket
V: valve chip
l: endless circumference
r: radius of endless circumference as an entire circle
w: interval between perforated openings 3
Δl: length of perforated opening 3 on circumference

DETAILED DESCRIPTION OF THE INVENTION

Preferred embodiments and examples of the present invention are explained below referring to the drawings. FIG. 1 is a vertical section view showing an upper part of a completely closed battery by way of an example of the present invention. FIG. 2 is a vertical section view showing an upper part of a completely closed battery by way of another example of the present invention. FIG. 3 is a plan view showing a closing member having a valve element. FIG. 4 is a vertical section view showing the closing member. FIGS. 5 and 6 are explanatory views showing actions of the closing member when the internal pressure of the battery is abnormally elevated. FIGS. 7 and 8 are plan views showing the other examples of the closing member.

In FIG. 1, cylindrical outer container 30 having a bottom, which serves as a negative electrode terminal, accommodates an electrode element 32 together with an electrolyte which are isolated from the outside. Electrode element 32 is configured such that a laminate, which is composed of a positive electrode 32a, separator 32b, and negative electrode 32c disposed against the positive electrode 32a and insulated from positive electrode 32a by separator 32b, is wound in a coiled form.

Closing cap 33 having through holes 0, 0 for gas releasing, which serves as a burst-proof mechanism and at the same time as a positive electrode terminal, is secured by calking to upper open end portion of outer container 30 via insulating gasket 34. Above electrode element 32, lead cover 37 having through hole for gas releasing 37b is disposed.

Between lead cover 37 and positive temperature coefficient element 38, a resistance value of which is increased as the temperature increases thereby to control the current of the battery to a normal level, valve chip V, which forms closing member for enclosing the electrode element 32 and others, is provided. Periphery 36 of valve chip V is in contact with positive temperature coefficient element 38, which is in contact with periphery 33a of closing cap 33. These peripheries 36 and 33a, and positive temperature coefficient element 38 are secured by calking to circumference 37a of lead cover 37 via insulating gasket 40.

Lead wire 6 is attached, by an appropriate means, to an inner surface of valve chip V serving as the closing member for closing the upper open end portion of the battery. Lead wire 6 is extended to positive electrode 32a of electrode element 32. Thus, there is provided a current path of the battery.

The current path may be provided otherwise as shown in FIG. 2. Namely, lead cover 37 is disposed opposing valve chip V with insulating gasket 40 interposed between them and concave portion 20 is formed at the center portion of valve chip V, which is in contact with projection 24 formed at the center portion of lead cover 37. Lead wire 6 is attached, by an appropriate means, to the inner surface of lead cover 37 and lead wire 6 is extended to positive electrode 32a of electrode element 32. Thus, there is provided an example of the current path.

Valve chip V has a substantially disc shape in a plan view as shown in FIGS. 3 and 4. Valve chip V is composed of metal substrate 1 having a circular shape and metal foil 2 laminated to the inner surface of metal substrate 1. As a material for metal substrate 1, steel sheet, stainless steel sheet, copper sheet or aluminum sheet may be used. As a material for metal foil 2, steel foil, stainless steel foil, copper foil, aluminum foil, nickel foil or nickel alloy foil, for example nickel-iron alloy foil may be used.

In FIG. 3 showing an example of the present invention, a plurality of perforated openings 3 ("n" number of perforated openings, i.e., 8 openings in case of FIG. 3) (each having a circular shape in case of FIG. 3) are disposed such that their respective centers are present on an endless circumference 1 (circumference 1 with radius "r" around the center position of valve chip V in FIG. 3), and spaced with equal intervals "w" between them such that they form an endless in a circular line. As shown in FIG. 4, metal foil 2 has lead wire 6 attached to brazed portion 8, for example. When the internal pressure of the battery is elevated, portions of the equal intervals "w" of metal substrate 1 which are liable to be transformed are elongated and portion 5 of valve chip encircled by plurality of perforated openings 3 is projected so as to permit the lead wire 6 to be detached from brazed portion 8 or be broken to cut off the current.

The sum length: n×Δl (Δl represents a substantial length of each perforated opening 3 on circumference 1) of these plurality ("n" number) of perforated openings 3 may preferably be 30 to 85% of the whole length of the circumference 1. In a case where the sum length of the perforated openings is less than 30% of the whole length of the circumference, the rigidity of metal substrate 1 becomes higher. Accordingly, even when the internal pressure is elevated, portion 5 of the valve chip is not projected sufficiently and hence lead wire 6 is not detached from brazed portion 8. Therefore, it is impossible to cut off the current. On the other hands, in a case where the sum length exceeds 85% of the whole length of the circumference 1, if any outer large force is applied to the battery, dropping of the battery, for instance, portion 5 of the valve chip is sometimes deformed to cause lead wire 6 to be detached from brazed portion 8 or be broken so as to cut off the current.

Next, an action of the valve chip in an abnormal circumstance where the internal pressure of a battery is elevated is explained. Once the internal pressure of the battery is elevated, portions of equal intervals between perforated openings 3 (easily transformable portions) disposed in a line of the endless circumference on metal substrate 1 with equal intervals of "w" between them are elongated equally and portion 5 of the valve chip is projected, as shown in FIG. 5. Due to such projection of portion 5 of the valve chip, lead wire 6 attached to metal foil 2 is detached from brazed portion 8 or breaks itself so as to reliably cut off the current. When the internal pressure is further elevated, portions of metal foil 2 that close perforated openings 3 are ruptured to render valve openings unclosed and release the internal pressure, as shown in FIG. 6. The released gas is discharged outside through valve openings 7 and through holes 0 of closing cap 33.

In contrast, in cases where perforated openings 3 are not present in such a line of the endless circumference with the equal intervals "w" on metal substrate 1 but are present in a horseshoe shape, for example, when the internal pressure is elevated, a tongue-shaped portion of metal substrate 1 that is encircled by horseshoe-shaped perforated opening 3 is deformed, with a continuous and single portion of metal substrate 1 having interval "w" being as the fulcrum, and in particular a certain portion of this tongue-shaped portion where is most distant from the above mentioned fulcrum is largely deformed and a portion of metal foil 2 corresponding thereto is ruptured to release gas and the internal pressure of the battery is set free. However, since the center portion of valve chip V to which lead wire 6 is connected is near the above mentioned fulcrum for causing such deformation, there is only little deformation and the connecting portion of lead wire 6 is not broken. Thus, there may be a danger that the excessively large current which caused the elevation of the internal pressure of the battery keeps flowing. As a consequence, the most important factor of the present invention is that perforated openings 3 are disposed in a line of an endless circumference on metal substrate 1 with equal intervals "w" between them.

Incidentally, the shape of portion 5 of valve element may be shown in FIG. 3, in which the plurality of circular openings are disposed in a line of the circumference with the equal intervals between them. For example, as shown in FIGS. 7 and 8, it may be such that two or four ellipse-like openings 3 are disposed on ellipse 1 whose axis is at the center of valve chip V, with equal intervals "w" between them.

According to the completely closed battery of the present invention, when the internal pressure of the battery is elevated due to some abnormality such as short circuit, overcharge, or reverse charge, the equal interval portions (easily transformable) between perforated openings 3 disposed on metal substrate 1 with equal intervals between them are stably and accurately elongated especially at a low pressure so that portion 5 of valve element is projected to disconnect lead wire 6 and electrically cut off the current. When the internal pressure is further elevated, the portions of metal foil 2 that close perforated openings 3 are ruptured at a fixed pressure to render the valve openings 7 unclosed and discharge the inner gas of the battery. Accordingly, it is possible to prevent abrupt elevation of the temperature and burst of the battery.

The operating pressure, which stably permits portion 5 of valve element of the valve chip to be projected, can be set by determining an appropriate size of the equal interval portions (easily transformable) between perforated openings 3 on metal substrate 1 and by determining a suitable material composition for metal substrate 1. Also, it is possible to rupture metal foil 2, which closes perforated openings 3, at a stable operating pressure by determining a suitable material composition for metal foil 2, since metal foil 2 can be manufactured with the highest accuracy in the micron order.

The valve element of the present invention is manufactured in the following manner. Namely, metal substrate 1, which has a strip shape, is perforated continuously along the longitudinal direction thereof by punching or the like so as to provide thereon a number of openings 3 required for one valve chip V. The thus perforated metal substrate 1 is laminated on one surface thereof with metal foil 2. Then, the resultant laminate is blanked out in a form of each valve chip V having a substantially circular shape. The strip of metal substrate 1 is transferred by several pairs of rolls or continuously laminated to metal foil 2 by a pair of rolls. In a case where the metal substrate has a structure such that only one portion of the circle is not perforated, like a horseshoe shaped opening, and when such a metal substrate is transferred and laminated, the edge portions of such perforated opening are sometimes caught by the rolls. In such a case, the valve chip are turned up with the non-perforated portion as a fulcrum. The thus produced defective chips have to be scrapped. Further, there may be a case where the continuous transfer and lamination operation will become impossible.

According to the present invention, perforated openings 3 are formed with a plurality of non-perforated portions present and perforated openings 3 are perforated such that the non-perforated portions are provided parallel to the longitudinal direction (transfer direction) of the strip of metal substrate 1. Accordingly, it is possible to prevent the edge portions of the openings from being caught by the rolls or the valve chip from being turned up with the non-perforated portion as a fulcrum in the transfer and lamination operations.

As mentioned above, even when the internal pressure of a battery is elevated due to short circuit, overcharge, reverse charge, or the like, the safety valve chip of the present invention operates to permit the easily transformable portions provided on the metal substrate to deform stably so as to cut off the current in the battery at the time when the internal pressure reaches a fixed value at a relatively low pressure. When the internal pressure is further elevated, the metal foil, which closes the perforated openings provided on the metal substrate is ruptured stably and accurately so as to discharge gas with in the battery outside. Thus, it is possible to prevent an abrupt elevation of the temperature or burst of the battery.

What is claimed is:

1. A closed battery comprising an outer container, an electrode element consisting of a positive electrode, a negative electrode, and a separator, accommodated in said outer container together with an electrolyte, and a closing member secured to an inner periphery of an open end portion of said outer container so as to close the open end portion, said closing member consisting of a valve element and a metal foil produced by continuously laminating, said valve element being formed of a metal substrate, on which a plurality of perforated openings are disposed along an endless circumference with small intervals between each opening, and said metal foil being laminated to an inner surface of the metal substrate so as to close said perforated openings, wherein portions of said small intervals between said openings formed on the metal substrate, which are transformable by a small force, are elongated so as to cause a portion of the metal substrate encircled by said plurality of perforated openings disposed on the endless circumference to be projected when internal pressure of the closed battery is increased.

2. A closed battery according to claim 1, wherein said metal foil laminated to the portion encircled by the plurality of perforated openings is connected with a lead cover for conducting a current which flows from the positive electrode to the negative electrode and when said portion encircled by the plurality of perforated openings is projected due to the internal pressure of the battery, said lead cover is electrically disconnected from the metal foil to cut off the current, the metal foil is ruptured by more increased internal pressure of the closed battery and the gas in the closed battery is discharged.

3. A closed battery according to claim 1, wherein said plurality of perforated openings are circular openings having the same diameter and are disposed with equal intervals respectively on a circumference of a fixed radius from the center of the valve element, which is on endless circumference.

4. A closed battery according to claim 1, wherein the sum total length of the openings formed as the plurality of perforated openings on said endless circumference is 30 to 85% of the whole length of the endless circumference.

5. A closed battery according to claim 1, wherein said metal substrate is a steel sheet, a stainless steel sheet, a copper sheet, or an aluminum sheet.

6. A closed battery according to claim 1, wherein said metal foil is a steel foil, a stainless steel foil, a copper foil, an aluminum foil, a nickel foil, or a nickel-iron alloy foil.

7. A closing member for use in the battery according to claim 1.

* * * * *